J. H. FENTON.
Toe-Weights for Horses.
No. 211,840. Patented Feb. 4, 1879.
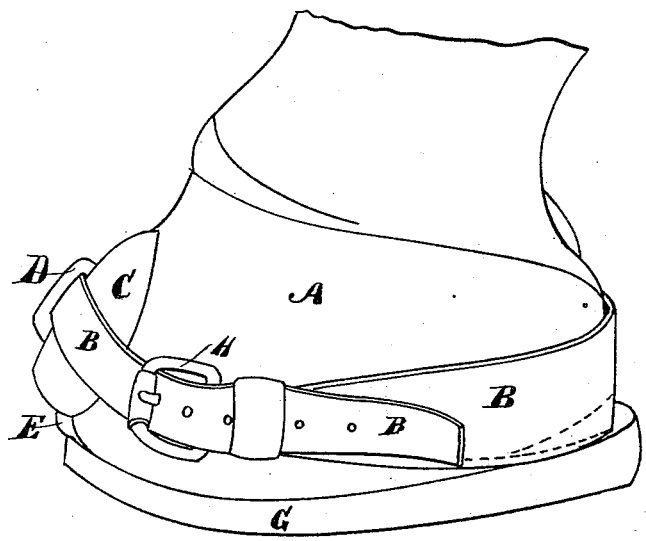

UNITED STATES PATENT OFFICE.

JOHN H. FENTON, OF INDIANAPOLIS, INDIANA.

IMPROVEMENT IN TOE-WEIGHTS FOR HORSES.

Specification forming part of Letters Patent No. 211,840, dated February 4, 1879; application filed October 5, 1878.

*To all whom it may concern:*

Be it known that I, JOHN H. FENTON, of Indianapolis, in the county of Marion, and State of Indiana, have invented a new and useful Improvement in Toe-Weights for Horses, of which the following is a description, reference being had to the accompanying drawings.

The object of my invention is to provide a toe-weight with a spur and strap, which can be readily adjusted and secured to the toe of the horse's hoof, for the purpose of producing a better knee action of the horse.

Prior to my invention spurs have been made and attached to or forming part of the shoe, and the weights secured thereon; and spurs also have been made solid, forming part of the weight, and secured to the hoof; also spurs have been made with a hinge and riveted onto the weight; but I am not aware that a weight with an independent detachable spur has been heretofore constructed and secured together, and also secured to the hoof of a horse by means of a strap, as in my invention.

My invention consists of the new construction and arrangement of the weight and spur, and in the new combination of parts, as will be hereinafter fully set forth and described.

In the accompanying drawings, in which like letters of reference in the different figures indicate like parts, Figure 1 represents a perspective view of a horse's hoof, showing a side view of my improved toe-weight attached thereto. Fig. 2 is a perspective view of the spur. Fig. 3 is a perspective view of the toe-weight. Fig. 4 is a perspective view of the rear side of the weight. Fig. 5 is a perspective view of the rear side of the toe-weight, with the spur in position; and Fig. 6 is a vertical section of the toe-weight and spur.

A represents the hoof of a horse, and B the strap for securing the toe-weight and spur to the hoof. C is the weight, made oval on the outside, heavy at the base, and gradually tapering toward the top. The side that comes in contact with the hoof is concaved to conform with the curve of the hoof. The weight C is perforated with an oblong hole or mortise, K, having a larger recess, N M, at the rear side to receive the spur J E E'.

The spur is made with a projection, E, having a lug, J, projecting outward from the front side, said lug having a mortise or slot, I, formed between the parts D and J, to permit the strap B to pass through.

The lower end of the upright E is provided with a spur, E', that fits in a notch formed in the under part of the hoof and between the hoof A and shoe G. The perforated lug J I passes through the hole or mortise K of the weight, and the part E fits in the recess N M, with the lug J projecting through the weight, as shown in Figs. 1, 3, and 6, so that the strap B can pass through the slot I and bind the spur to the weight, and at the same time bind the spur and weight to the hoof, as shown in Figs. 1 and 3. The strap B acts as a key, and prevents the spur from rattling in the weight; and when the spur E' is inserted in the notch found in the hoof between the shoe and hoof, and the strap is buckled tightly around the hoof, the weight and spur are firmly secured, thus preventing the weight and spur from making any noise or clattering and from pounding the hoof when the horse is traveling.

What I claim as new, and desire to secure by Letters Patent, is—

1. The weight C, having a mortise, K, combined with the spur E E', provided with the projecting lug J, substantially as shown and described.

2. In combination with the weight C and spur J E E', the strap B, all substantially as shown and described.

3. In combination with the spur E E', provided with lug J, having a slot or opening, I, for a strap, the weight C, having a mortise, K, whereby the weight is supported on the spur, and the spur and weight adapted to be secured together, and also to the hoof of a horse, substantially as shown and described.

In testimony whereof I have signed my name to this specification in the presence of two subscribing witnesses.

JOHN H. FENTON.

Witnesses:
E. O. FRINK,
D. F. SPEES.